United States Patent Office 2,881,209
Patented Apr. 7, 1959

2,881,209

PREPARATION OF PHENYLMALONIC ACID

John F. Nobis and Louis F. Moormeier, Cincinnati, Ohio, assignors to National Distillers and Chemical Corporation, New York, N.Y., a corporation of Virginia No Drawing. Application June 11, 1954
Serial No. 436,241

3 Claims. (Cl. 260—515)

This invention relates generally to an improved method for the preparation of phenylmalonic acid and its derivatives, particularly diesters of phenylmalonic acid.

There are a number of processes by which phenylmalonic acid and its diesters such as dimethyl and diethyl esters can be prepared. The best of these methods and the ones in commercial use start with benzyl chloride which is converted to benzyl cyanide and this compound is then converted to phenylacetic acid and ethyl phenylacetate. By one route, the ethyl phenylacetate is converted with diethyl carbonate and sodium ethoxide to diethyl phenylmalonate. An alternate method consists of treating the ethyl phenylacetate with diethyl oxalate and sodium ethoxide to give diethyl phenyloxalylacetate which is then decarboxylated to give diethyl phenylmalonate. These methods are long, involved and expensive in addition to requiring the isolation of a number of intermediates. However, this new and improved process for phenylmalonic acid and dimethyl or diethyl phenylmalonate avoids all of the difficulties associated with the above processes.

In accordance with this improved method, dimethyl phenylmalonate can be prepared in one reactor from chlorobenzene, dispersed sodium, toluene, carbon dioxide, hydrochloric acid and methanol. This new process combines economy with simplicity of plant design.

It has now been discovered that phenylmalonic acid and its diester derivatives can be prepared in good yields and selectivities directly from chlorobenzene. The chlorobenzene is initially reacted with finely dispersed sodium in toluene. This reaction gives a substantially quantitative yield of phenylsodium. The phenylsodium is directly and immediately thereafter quantitatively converted to benzylsodium by the metalation of an equimolar portion of the toluene reaction medium. The resulting benzylsodium is carbonated under selective and critical conditions to give a relatively high yield of phenylmalonic acid with only a minor portion of phenylacetic acid. The acidic components of the reaction mixture can then be esterified to produce the methyl esters which are easily separated by distillation. If desired, the acids can be separated first and the pure phenylmalonic acid esterified to give the diester. This esterification is unusually difficult because of the great tendency of the phenylmalonic acid towards decarboxylation. For this reason, the conditions are extremely critical and comprise an integral part of the new process since esterification of this diacid has not previously been feasible.

Furthermore, certain conditions are essential for formation of maximum yields of phenylmalonic acid. It is initially necessary to prepare phenylsodium from chlorobenzene and finely dispersed sodium. These materials are reacted together at a temperature of 0 to 40° C. and preferably about 25 to 30° C. in a reaction medium consisting solely of toluene. This results in the quantitative formation of phenylsodium. The reaction mixture containing the phenylsodium is refluxed for a period of about two hours. These reactions give an essentially quantitative yield (95 to 99%) of benzylsodium from the chlorobenzene. The reaction is as follows:

$$C_6H_5Cl + 2Na \rightarrow C_6H_5Na + NaCl$$
$$C_6H_5Na + C_6H_5CH_3 \rightarrow C_6H_5CH_2Na + C_6H_6$$

Carbonation of benzylsodium gives, as the initial carbonation product, the sodium salt of phenylacetic acid according to the following equation:

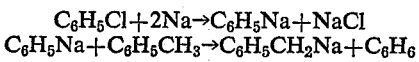

While it had been previously reported that some phenylmalonic acid is thus formed during gaseous carbonation of benzylsodium at low temperatures, no attempt had previously been made to control carbonation conditions so that the desired phenylmalonic acid was produced as the major product of the total reaction.

At carbonation temperatures from 30 to 60° C. and under critical conditions, phenylmalonic acid is produced in a yield of about 70% with an accompanying 25% yield of phenylacetic acid. The disodium salt of phenylmalonic acid is produced according to the following reaction:

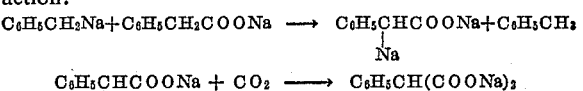

It was found that the yield of phenylmalonic acid could not be increased much above 70% regardless of carbonation temperature or rate. It was evident though, that carbonation at high temperatures decreased the yield of phenylacetic acid, but all of the sodium and chlorobenzene could not be accounted for in isolated products. This apparent anomaly is explainable if a continuing metalation reaction is assumed. This, if the alpha carbon atom is metalated further by unreacted benzylsodium in the presence of carbon dioxide, there would be produced the trisodium salt of phenyltricarboxymethane, $C_6H_5C(COONa)_3$. On neutralization with hydrochloric acid, the phenyltricarboxymethane would be expected to decarboxylate to phenylmalonic acid. Actually, in the experiments where a low yield was obtained, considerable carbon dioxide was evolved during neutralization.

The sodium which is reacted with the chlorobenzene should be in finely dispersed form. It is preferably employed as a 10–20% dispersion in toluene. Furthermore, the dispersion should be freshly prepared to avoid troublesome induction periods and initiation difficulties. The average particle size of the sodium particles in the dispersion should be below 25 microns. An excess of sodium of about 10–20% based on the stoichiometric amount is required. However, in a preferred modification an attrition apparatus, such as a ball mill or pebble mill, can be employed. This eliminates the necessity for an excess of sodium, since the appropriate stoichiometric amount of sodium is quite satisfactory. It is necessary to have the toluene present in considerable excess for the best ultimate yields. The presence of other hydrocarbon diluents, such as benzene, gives reduced yields. Hence, the toluene is conveniently employed as the reaction medium for the reaction of chlorobenzene with sodium. An inert atmosphere should also be employed to avoid undesired side reactions of sodium and hydrolysis of the organosodium compounds.

The yield of phenylsodium under these optimum conditions is essentially quantitative. If desired, the exact amount may be determined by carbonation and conversion to benzoic acid or by titration of an aliquot portion for sodium chloride.

The phenylsodium is directly and immediately converted to benzylsodium by reaction with the toluene at reflux temperature (110° C.).

In order to obtain selective and high yields of the desired phenylmalonic acid with only minor amounts of phenylacetic acid, it is necessary to add gaseous carbon dioxide to the benzylsodium suspension over a period of several hours at 30° to 60° C. This temperature is important to obtain the best product balance based on chlorobenzene. There is obtained a 70% yield of phenylmalonic acid along with 25% of phenylacetic acid. Efficient stirring is necessary throughout the entire reaction period to insure mixing of gas, liquid, and solid phases, and to permit controlled reaction rate. After carbonation, any excess sodium and/or organosodium compounds are decomposed and the free acids esterified directly or recovered by precipitation.

Treatment of the reaction mixture containing the sodium salts of the acids directly with 15 to 20 parts of methanol to one part of acid and hydrogen chloride in excess, followed by a heating period of about five hours at 60° C. gives a mixture of a major proportion of dimethyl phenylmalonate and a minor proportion of methyl phenylacetate in the ratio of about 3 to 1. This mixture is easily separated by distillation. If desired, the free acids may be separated before esterification by their solubility differences in benzene and the phenylmalonic acid esterified separately. The yield of dimethyl phenylmalonate, based on phenylmalonic acid, is 95%; while the over-all yield, based on chlorobenzene, is 65–70%. Similar yields of the diethyl ester are obtained by employing absolute ethanol under similar reaction conditions.

The invention will be more fully described by the following examples, but it is not intended to be limited specifically thereto.

EXAMPLE 1

The sodium dispersions are stable suspensions of sodium in inert hydrocarbon media with particles ranging in size from submicron to 25 microns in diameter. Methods of preparation, properties, and uses of 50% sodium dispersions are well known to the art. In general, less concentrated dispersions are better for this process.

Preparation of the 15% sodium dispersions may be accomplished in either of several ways, as by formation of a 50:50 dispersion of sodium and liquid medium in small equipment, followed by transfer to a large reactor for dilution to the 15% sodium concentration (by weight), or by dispersion of the sodium at the desired 15% sodium concentration in a vessel large enough to handle subsequent reactions. The dispersion may then be diluted with the desired media in the same reactor or after transfer to the larger reactor, as in the second method. An inert atmosphere should be maintained at all times to avoid deactivation of the sodium or hydrolysis of the phenylsodium.

To 54 grams (2.34 gram-atoms) of finely dispersed sodium (nitrogen atmosphere, less than 25-micron particle size average) suspended in 275 grams of toluene in a three-necked flask at 25° to 30° C. is added slowly, with gentle agitation, a mixture of 112.5 grams (1 mole) of chlorobenzene and 100 grams of toluene. Initiation of reaction usually occurs 1 to 5 minutes after addition of the first 10 to 25 ml. of the chlorobenzene-toluene mixture and is characterized by an increasingly rapid temperature rise, plus the appearance of the black phenylsodium particles. The temperature of the reacting mixture should not be allowed to exceed 40° C. The rate of addition and cooling should be regulated so that the formation of the phenylsodium will be complete in 20 to 30 minutes.

The resulting toluene suspension of phenylsodium is refluxed for two hours. Carbonation is then effected by the slow introduction of gaseous carbon dioxide into the total reaction mixture. In some cases approximately one-half of the theoretical quantity of carbon dioxide was added rapidly to the benzylsodium suspension. After this addition, the reaction mixture was allowed to stir for a 30 to 60 minute period. Although this procedure should serve to convert one-half of the benzylsodium to sodium phenylacetate and the stirring period that followed would allow for metalation of the sodium phenylacetate by the remainder of the benzylsodium, this technique did not materially increase the yield of phenylmalonic acid (see Table I). However, the carbonation time was reduced and a tendency toward a better product balance was observed when this procedure was used.

When carbonation was complete, the resulting slurry was added to water and steam for decomposition. When the excess sodium had been destroyed, the water layer was separated and treated with decolorizing carbon. The resulting solution of salts was cooled to 0° C. and neutralized with hydrochloric acid. In the presence of phenylacetic acid and sodium chloride, some phenylmalonic acid is carried down. The phenylacetic acid may be removed by extraction with benzene. Phenylmalonic acid can be separated from the water and salt by extraction with ethyl ether. Evaporation of the ether under vacuum gives phenylmalonic acid (melting point, 150° to 152° C.). Since phenylmalonic acid readily decarboxylates to phenylacetic acid, some care should be taken in neutralization and evaporation steps to avoid temperatures above 30° C. to insure maximum yields.

EXAMPLE 2

In all of the experiments listed in Table I, gaseous carbon dioxide was introduced to the suspension of benzylsodium. The rate of carbonation of the surface of the reaction mixture is controlled by the rate of stirring and by the flow of carbon dioxide.

Table I illustrates the various effects due to changes in rate and temperature of carbonation of benzylsodium. As the temperature of carbonation of benzylsodium nears −70° C. the rate at which benzylsodium metalates the initially formed sodium phenylacetate approaches zero. Thus, carbonation of benzylsodium on Dry Ice gives 97% phenylacetic acid; gaseous carbonation at −30° C. gives 60% phenylacetic acid and 40% phenylmalonic acid. Gaseous carbonation under controlled conditions of benzylsodium at 30° to 60° C. (Experiment 5, Table I) gives a 67% yield of phenylmalonic acid along with 27% phenylacetic acid.

Table I

| Expt. No. | Carbonation | | Phenyl- acetic acid yield, percent | Phenyl- malonic acid yield, percent | Total yield | Remarks |
|---|---|---|---|---|---|---|
| | Temp., °C. | Time, min. | | | | |
| 1 | −30 | 60 | 60 | 24 | 84 | |
| 2 | 5 | 100 | 43 | 48 | 91 | |
| 3 | 30 | 195 | 16.3 | 67.3 | 83.6 | |
| 4 | 40 | 30 | 16.3 | 67.6 | 83.9 | Approx. one-half theoretical quantity CO₂ added in 20 min.; carbonation completed rapidly in 10 min. |
| 5 | 30–60 | 90 | 27.5 | 67.3 | 94.8 | Approx. one-half theoretical quantity CO₂ added in 10 min.; stirred 30 min.; carbonation completed slowly in 80 min. |
| 6 | 50–60 | 240 | 5.2 | 72.1 | 77.3 | |
| 7 | 70–80 | 240 | 3.7 | 74.0 | 77.7 | |
| 8 | 85–110 | 120 | 9.0 | 63.4 | 72.4 | |
| 9 | 90–100 | 240 | 5.1 | 69.8 | 74.9 | |

EXAMPLE 3

Dimethyl phenylmalonate may be prepared, in yields up to 94%, by heating a benzene-methanolic solution of phenylmalonic acid and hydrogen chloride at 60° C. for 5 hours. The results, listed in Table II, show that a large excess of methanol (at least 10 to 1 mole ratio) is required for maximum yields. Concentrated sulfuric acid can also be used as an esterification catalyst. Yields of ester up to 87% are possible if a 3 to 1 mole ratio of sulfuric acid to phenylmalonic acid is used. It is also important to allow the reaction mixture (phenylmalonic acid, methanol, sulfuric acid, benzene) to stir at room temperature (about 25° C.) for several hours before raising the temperature to 65° C. Reaction temperatures below 65° C. give slightly lower yields of ester.

The diethyl ester of phenylmalonic acid may be prepared (85% yield) by treatment of the acid with absolute ethyl alcohol and anhydrous hydrogen chloride in benzene solution for 5 hours at 60° C.

EXAMPLE 4

It is also possible to prepare dimethyl phenylmalonate in a stepwise, one-reactor process, from sodium, chlorobenzene, toluene, carbon dioxide, methanol, and hydrogen chloride. After carbonation of benzylsodium at 30° to 50° C. the reaction mixture containing disodium phenylmalonate, sodium phenylacetate, and a small amount of free sodium is treated with a large excess of methanol (10 parts methanol to 1 part phenylmalonic acid). When this addition is complete, anhydrous hydrogen chloride may be passed through the resulting thick slurry in order to neutralize the sodium salts of the organic acids and the sodium methoxide formed from the free sodium. When neutralization is complete, the reaction mixture is heated at 60° C. for 5 hours. Anhydrous hydrogen chloride is passed through the solution during the entire heating period. At the end of this time, the addition of water will serve to remove the sodium chloride (from original chlorobenzene reaction, from excess sodium, and from esterification). The benzene (present as a result of the phenylsodium metalation reaction) and toluene can be removed by flash distillation. Dimethyl phenylmalonate (boiling point 148° to 152° C./10 mm.; melting point, 47° to 49° C.) and methyl phenylacetate (boiling point, 100 to 110° C./10 mm.) are then separated by vacuum distillation.

Similarly, the diethyl esters can be prepared by the substitution of ethanol for methanol.

What is claimed is:

1. In a process in which the sodium salt of phenylmalonic acid is prepared by carbonation of benzyl sodium, the improvement which comprises the steps of reacting finely dispersed sodium having an average particle size of less than 25 microns and chlorobenzene in a reaction medium consisting solely of toluene at a temperature of about 0° to 40° C., refluxing the total reaction mixture to produce benzyl sodium, and immediately thereafter contacting the mixture with gaseous carbon dioxide at a temperature of about 30° to 60° C. in an amount substantially less than theoretically required to carbonate all of the benzyl sodium in said mixture, and then contacting the resulting partially carbonated mixture with an amount of carbon dioxide sufficient to produce a carbonated mixture comprising a major proportion of the disodium salt of phenylmalonic acid and a minor proportion of the sodium salt of phenylacetic acid.

2. The process of claim 1 wherein said reaction between the finely dispersed sodium and the chlorobenzene is carried out at a temperature of about 25° to 30° C.

3. In a process in which the sodium salt of phenylmalonic acid is prepared by carbonation of benzyl sodium, the improvement which comprises the steps of reacting finely dispersed sodium having an average particle size of less than about 25 microns and chlorobenzene in a reaction medium consisting solely of toluene at a temperature of about 25° to 30° C., refluxing the total reaction mixture to produce benzyl sodium, and immediately thereafter contacting the mixture with gaseous carbon dioxide at a temperature about 30° to 60° C. in an amount of about 50% of that theoretically required to carbonate all of the benzyl sodium in said mixture, and contacting the resulting partially carbonated mixture with an amount of gaseous carbon dioxide at 30° to 60° C. sufficient to produce a carbonated mixture comprising a major proportion of the disodium salt of phenylmalonic acid and a minor proportion of the sodium salt of phenylacetic acid.

Table II

| Expt. No. | Phenylmalonic acid, moles | Absolute methanol,ᵃ moles | Temp., °C. | Time, min. | Dimethyl phenylmalonate yield, percent | Methyl phenylacetate yield, percent | Total yield | Remarks |
|---|---|---|---|---|---|---|---|---|
| 1 | 0.11 | 1.85 | 60 | 330 | 93.1 | | 93.1 | Anhydrous HCl bubbled through reaction mixture during heating. |
| 2 | 0.50 | 4.95 | 60 | 270 | 35.4 | 52.3 | 87.7 | Anhydrous HCl bubbled through reaction mixture during heating; low yield due to a decrease in the methanolphenylmalonic acid ratio from the usual 10/1 to 5/1. |
| 3 | 0.28 | 5.56 | 60 | 300 | 94.4 | | 94.4 | Anhydrous HCl bubbled through reaction mixture during heating. |
| 4 | 0.33 | 6.66 | 60 | ᵇ 1,080 | 80.0 | 19.7 | 99.7 | 1 mole H₂SO₄ catalyst |
| 5 | 0.33 | 6.66 | 65 | ᶜ 1,020 | 86.6 | 6.6 | 93.2 | Do. |
| 6 | 0.20 | 8.0 | 60 | ᵈ 1,320 | 85.9 | | 85.9 | 0.6 mole H₂SO₄ catalyst; increase in methanol phenylmalonic acid ratio from usual 10/1 to 20/1. |

ᵃ Reagent grade benzene, twice the volume of methanol, also used.
ᵇ Includes initial 2-hour stirring at 39° C.
ᶜ Includes initial 1-hour stirring at 31° C.
ᵈ Includes initial 2-hour stirring at 31° C.

References Cited in the file of this patent

UNITED STATES PATENTS 1,974,917   Halbig et al. _____ Sept. 25, 1934

OTHER REFERENCES

Morton et al.: J.A.C.S., vol. 60, pp. 1426–29 (1938).
Gilman et al.: J. Am. Chem. Soc. 62, 1301–2, 1514–20 (1940).
Hickinbottom: "Reactions of Organic Compounds," p. 100 (1948).